United States Patent
Sheldrake et al.

(10) Patent No.: US 8,955,553 B2
(45) Date of Patent: Feb. 17, 2015

(54) FLEXIBLE PIPE BODY WITH BUOYANCY ELEMENT AND METHOD OF PRODUCING SAME

(71) Applicants: Terence Henry Sheldrake, Newcastle-Upon-Tyne (GB); Andrew Peter Roberts, Newcastle-Upon-Tyne (GB); Zhimin Tan, Houston, TX (US)

(72) Inventors: Terence Henry Sheldrake, Newcastle-Upon-Tyne (GB); Andrew Peter Roberts, Newcastle-Upon-Tyne (GB); Zhimin Tan, Houston, TX (US)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 0 days.

(21) Appl. No.: 13/886,037

(22) Filed: May 2, 2013

(65) Prior Publication Data
US 2013/0299033 A1    Nov. 14, 2013

(30) Foreign Application Priority Data

May 8, 2012  (EP) .................................. 12167202

(51) Int. Cl.
*F16L 11/00*    (2006.01)
*E21B 17/01*    (2006.01)

(52) U.S. Cl.
CPC ............... *F16L 11/00* (2013.01); *E21B 17/012* (2013.01)
USPC ............ 138/129; 138/144; 138/134; 138/177

(58) Field of Classification Search
USPC ................... 138/137, 129, 140, 144; 441/133
See application file for complete search history.

(56) References Cited

U.S. PATENT DOCUMENTS

| | | | | |
|---|---|---|---|---|
| 3,773,090 | A | * | 11/1973 | Ghersa et al. ................. 138/141 |
| 3,847,693 | A | * | 11/1974 | Ghersa et al. ................... 156/79 |
| 3,957,112 | A | | 5/1976 | Knibbe et al. |
| 3,989,067 | A | * | 11/1976 | Gates, Jr. ...................... 138/129 |
| 6,364,022 | B1 | | 4/2002 | Kodaissi et al. |
| 6,978,804 | B2 | * | 12/2005 | Quigley et al. .................. 138/98 |
| 2003/0008577 | A1 | * | 1/2003 | Quigley et al. ............... 441/133 |
| 2010/0229995 | A1 | * | 9/2010 | Ong ............................. 138/129 |

FOREIGN PATENT DOCUMENTS

| | | |
|---|---|---|
| WO | 02072995 A1 | 9/2002 |
| WO | 02088587 A1 | 11/2002 |
| WO | 02095278 A1 | 11/2002 |
| WO | 2007125276 A1 | 11/2007 |
| WO | 2010041048 A1 | 4/2010 |
| WO | 2010141843 A2 | 12/2010 |

OTHER PUBLICATIONS

European Search Report dated Oct. 17, 2012 for EP Application No. 12167202.6-1266 (6 pgs.).

* cited by examiner

*Primary Examiner* — Patrick F Brinson
(74) *Attorney, Agent, or Firm* — Shumaker & Sieffert, P.A.

(57) ABSTRACT

A flexible pipe body and method of producing a flexible pipe body are disclosed. The flexible pipe body includes an inner fluid retaining layer; an armour layer provided radially outwards of the inner fluid retaining layer; and a buoyancy layer including a plurality of discrete elongate buoyancy elements provided radially outwards of the fluid retaining layer wound at a helical pitch angle equal to or more than 0 degrees and less than about 85 degrees to the longitudinal axis of the flexible pipe body.

14 Claims, 5 Drawing Sheets

FLEXIBLE PIPE BODY WITH BUOYANCY ELEMENT AND METHOD OF PRODUCING SAME

TECHNICAL FIELD

The present disclosure relates to a flexible pipe body including a buoyancy element, and a method of producing a flexible pipe body including a buoyancy element. In particular, but not exclusively, the present disclosure relates to a flexible pipe body suitable for use in the oil and gas industry.

BACKGROUND

Traditionally flexible pipe is utilized to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers. A riser is an assembly of one or more segments of flexible pipe connecting a sub-sea source to a surface station or vessel. A jumper is an assembly of flexible pipe connecting a sub-sea location to a further sub-sea location.

In some flexible pipe designs the pipe body includes one or more tensile armour layers. The primary loading on such a layer is tension. In high pressure applications, such as in deep and ultra deep water environments, the tensile armour layer experiences high tension loads from a combination of the internal pressure end cap load and the self-supported weight of the flexible pipe. This can cause failure in the flexible pipe since such conditions are experienced over prolonged periods of time.

Unbonded flexible pipe has been used for deep water (less than 3,300 feet (1,005.84 metres)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. As a result the need for high levels of performance from the tensile armour layer(s) of the flexible pipe body is increased.

To alleviate the above-mentioned problem of loading on the tensile armour layer, buoyancy aids may be added to the flexible pipe at predetermined locations along the length of a riser. For deep water applications, the buoyancy aids can provide an upward lift to counteract the weight of the riser, effectively taking a portion of the weight of the riser, at various points along its length.

Buoyancy aids can be formed as separate modules of highly buoyant material, or as hollow shells that can be filled with such buoyant material. Such buoyancy aids can be clamped or otherwise secured to desired positions on a flexible pipe.

Flexible pipe may also be used for shallow water applications (for example less than around 500 metres depth) or even for shore (overland) applications. Flexible pipe for shallow water applications may also employ buoyancy aids.

Each buoyancy aid is usually fitted to a flexible pipe at the point of use, i.e. when a pipe is payed out into the water from a floating facility, because flexible pipe generally cannot be stored on a reel when it includes bulky buoyancy aids. It would be useful to provide a flexible pipe that is less labor-intensive to put into use, whilst also being cost effective.

Another problem associated with riser assemblies is known as birdcaging, which is the lateral buckling of wires of a flexible pipe due to compressive forces acting on the pipe. This is more usually encountered at the touchdown area of a pipe (the point where a riser touches the sea bed for example) and may be caused by a vertical reciprocal movement of the riser due to wave action. Buoyancy aids attached to a riser may increase the ranges and severities of (repeated) compression and tension to the pipe in the touchdown area when a riser experiences vertical movements.

SUMMARY

In one aspect, the present disclosure is directed to a flexible pipe body including
  an inner fluid retaining layer;
  an armour layer provided radially outwards of the inner fluid retaining layer; and
  a buoyancy layer including a plurality of discrete elongate buoyancy elements provided radially outwards of the fluid retaining layer wound at a helical pitch angle equal to or more than 0 degrees and less than about 85 degrees to the longitudinal axis of the flexible pipe body.

In another aspect, the present disclosure is directed to a method of manufacturing a flexible pipe body, including:
  providing an inner fluid retaining layer;
  providing an armour layer radially outwards of the inner fluid retaining layer; and
  providing a buoyancy layer including a plurality of discrete elongate buoyancy elements, radially outwards of the fluid retaining layer wound at a helical pitch angle equal to or more than 0 degrees and less than about 85 degrees to the longitudinal axis of the flexible pipe body.

Certain embodiments provide the advantage that a flexible pipe body is provided that is useable in a riser assembly as a cost effective alternative to currently known configurations.

Certain embodiments provide the advantage that a flexible pipe body including buoyancy aid may be formed during manufacture at a plant and stored on a reel, obviating the need to add buoyancy aids to a flexible pipe at the time of pay out into the sea.

BRIEF DESCRIPTION OF DRAWINGS

Embodiments of the invention are further described hereinafter with reference to the accompanying drawings, in which:

FIG. 4b illustrates a perspective view of the flexible pipe body of FIG. 4a.

In the drawings like reference numerals refer to like parts.

DETAILED DESCRIPTION

Figure 2:
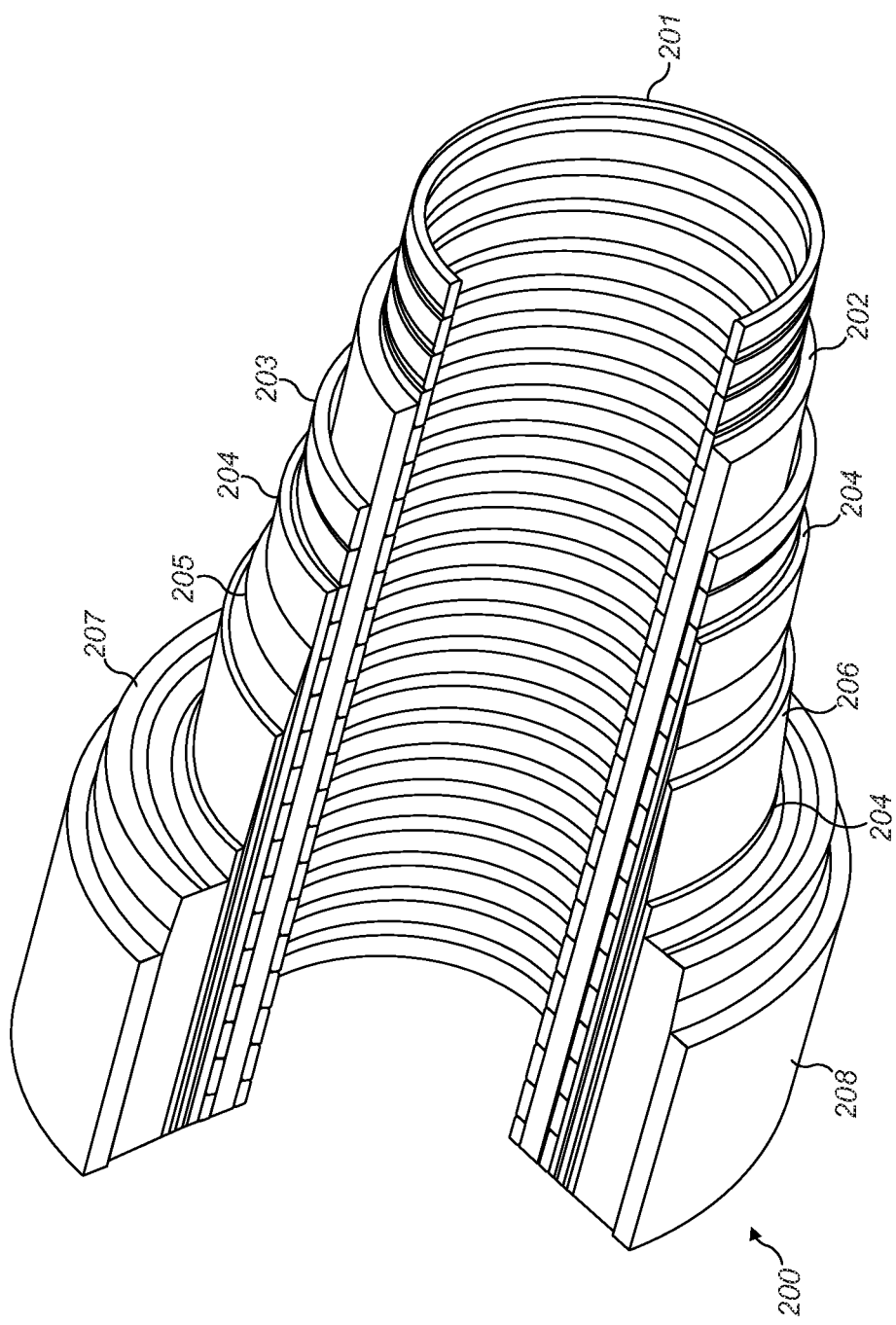
FIG. 2 illustrates a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 2 illustrates how pipe body 200 is formed from a combination of layered materials that form a pressure-containing conduit. Although a number of particular layers are illustrated in FIG. 2, it is to be understood that the present invention is broadly applicable to coaxial pipe body structures including two or more layers manufactured from a variety of possible materials. It is to be further noted that the layer thicknesses are shown for illustrative purposes only.

Figure 1:
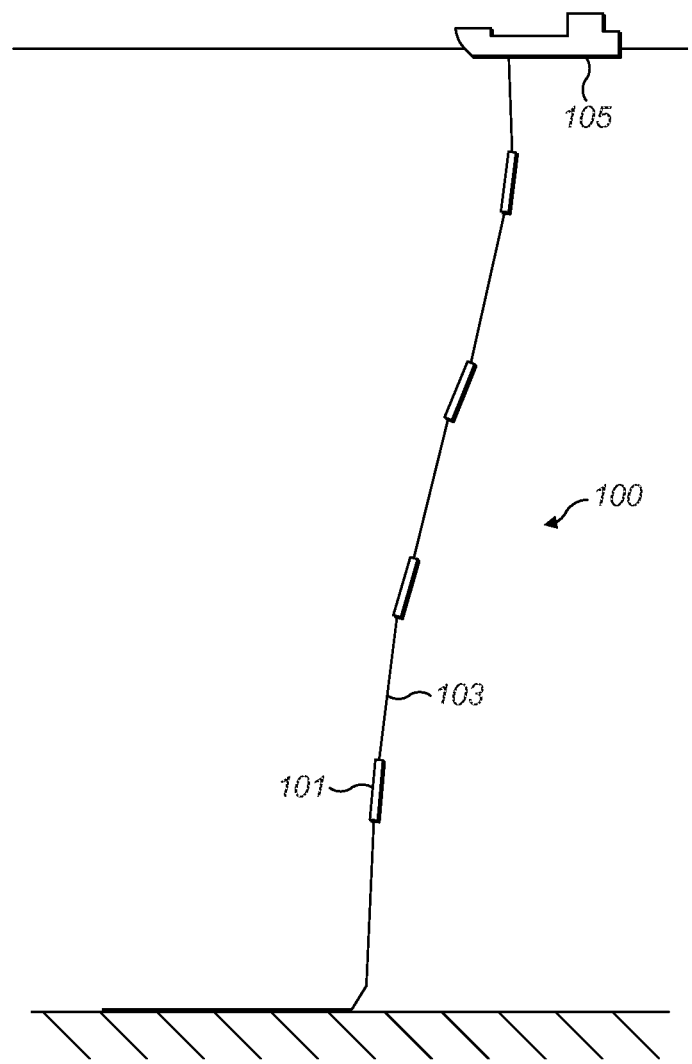
FIG. 1 illustrates a known riser assembly.

An example of a known riser configuration using buoyancy aids to support the riser is shown in FIG. 1, in which buoyancy aids 101 are provided at discrete locations along a flexible pipe 103. Here, the flexible pipe includes five segments of flexible pipe body and four junctions between adjacent segments of pipe body. At each junction, a buoyancy aid 101 is attached in some way to the flexible pipe to give uplift to the pipe and reduce the tension loading along the pipe length. The riser is suitable for transporting production fluid such as oil and/or gas and/or water from a subsea location to a floating facility 105 such as a platform or buoy or ship.

As illustrated in FIG. 2, a pipe body includes an optional innermost carcass layer 201. The carcass provides an interlocked construction that can be used as the innermost layer to prevent, totally or partially, collapse of an internal pressure sheath 202 due to pipe decompression, external pressure, and tensile armour pressure and mechanical crushing loads. It will be appreciated that certain embodiments of the present invention are applicable to 'smooth bore' operations (i.e. without a carcass) as well as such 'rough bore' applications (with a carcass).

The internal pressure sheath 202 acts as a fluid retaining layer and generally comprises a polymer layer that ensures internal fluid integrity. It is to be understood that this layer may itself comprise a number of sub-layers. It will be appreciated that when the optional carcass layer is utilized the internal pressure sheath is often referred to by those skilled in the art as a barrier layer. In operation without such a carcass (so-called smooth bore operation) the internal pressure sheath may be referred to as a liner.

An optional pressure armour layer 203 is a structural layer with a lay angle close to 90° that increases the resistance of the flexible pipe to internal and external pressure and mechanical crushing loads. The layer also structurally supports the internal pressure sheath, and typically consists of an interlocked construction.

The flexible pipe body also includes an optional first tensile armour layer 205 and optional second tensile armour layer 206. Each tensile armour layer is a structural layer with a lay angle typically between 10° and 55°. Each layer is used to sustain tensile loads and internal pressure. The tensile armour layers are often counter-wound in pairs.

The flexible pipe body shown also includes optional layers of tape 204 which help contain underlying layers and to some extent prevent abrasion between adjacent layers. The tape may be of polymer, such as PP or PA-11, and may be wound helically over an underlying layer.

The flexible pipe body may also typically include optional layers of insulation 207 and an outer sheath 208, which comprises a polymer layer used to protect the pipe against penetration of seawater and other external environments, corrosion, abrasion and mechanical damage.

Each flexible pipe comprises at least one portion, sometimes referred to as a segment or section of pipe body 200 together with an end fitting located at at least one end of the flexible pipe. An end fitting provides a mechanical device which forms the transition between the flexible pipe body and a connector. The different pipe layers as shown, for example, in FIG. 2 are terminated in the end fitting in such a way as to transfer the load between the flexible pipe and the connector.

Figure 3:
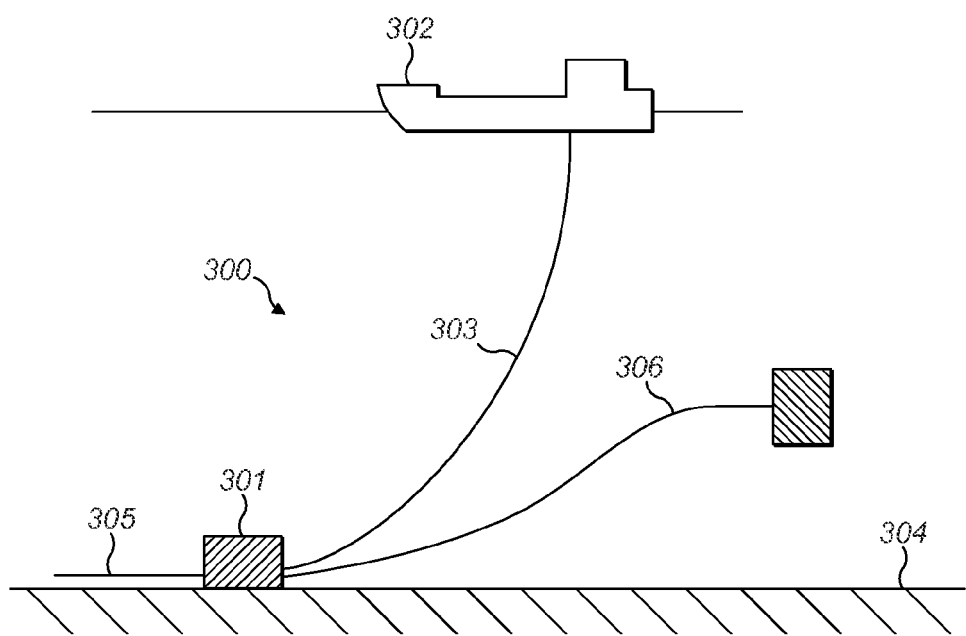
FIG. 3 illustrates a riser assembly.

FIG. 3 illustrates a riser assembly 300 suitable for transporting production fluid such as oil and/or gas and/or water from a sub-sea location 301 to a floating facility 302. For example, in FIG. 3 the sub-sea location 301 includes a sub-sea flow line. The flexible flow line 305 comprises a flexible pipe, wholly or in part, resting on the sea floor 304 or buried below the sea floor and used in a static application. The floating facility may be provided by a platform and/or buoy or, as illustrated in FIG. 3, a ship. The riser assembly 300 is provided as a flexible riser, that is to say a flexible pipe 303 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 3 also illustrates how portions of flexible pipe can be utilized as a flow line 305 or jumper 306.

Figure 4A:
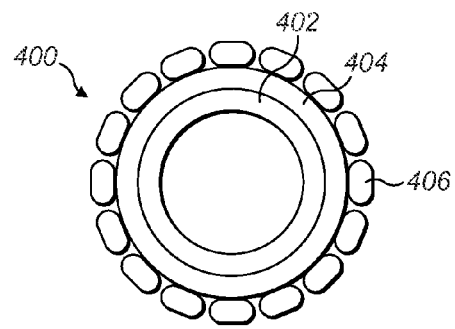
FIG. 4a illustrates a cross section of a flexible pipe body.
Figure 4B:
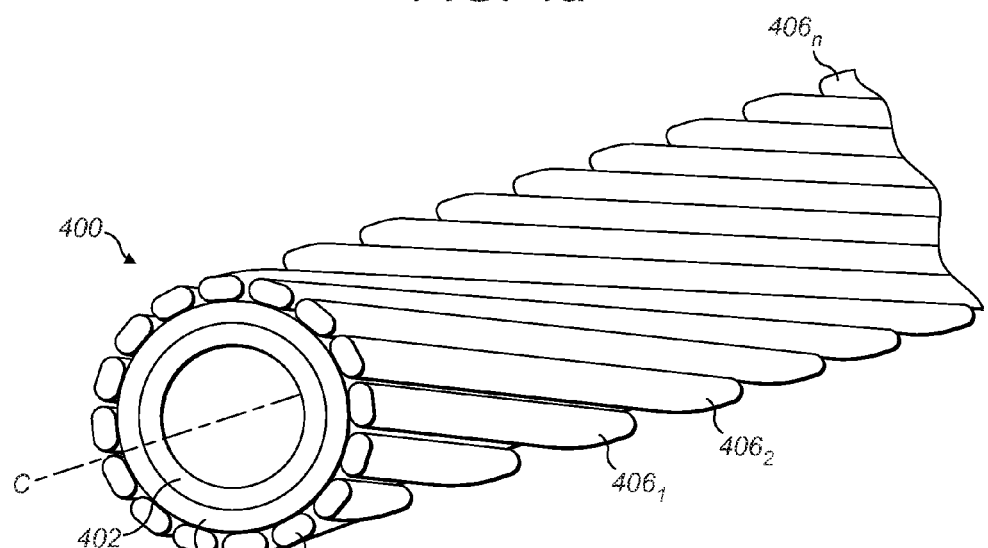

FIG. 4a illustrates a cross-sectional view of a portion of flexible pipe body 400 according to the present invention. FIG. 4b illustrates a perspective view of the flexible pipe body 400. The flexible pipe body is a conduit and generally tubular-shaped in overall form. The flexible pipe body includes an inner fluid retaining layer 402 (i.e. a liner or barrier layer) for containing the conveyed fluid such as oil or gas or water, which ensures internal fluid integrity. The inner fluid retaining layer 402 may be made of a polymer such as HDPE, PVDF, PA-11, PA-12, etc., or a metal or an alloy, as will be known to those skilled in the art.

The flexible pipe body 400 also includes one or more armour layer 404, which in this embodiment is a tensile armour layer. The armour layer could alternatively be a pressure armour layer. The armour layer 404 is a structural layer that increases the resistance of the flexible pipe to internal and/or external pressure such as mechanical crushing loads (pressure from the conveyed fluid pushing outwards or from the mass of sea water outside the pipe pushing inwards) or tensile loads. The armour layer 404 is formed from one or more helically wound elongate tape element, such as wires, formed from a suitable metal, in this case carbon steel. The tensile armour wires are wrapped over the fluid retaining layer in a helical manner (not shown in FIGS. 4a and 4b).

Provided further radially outwards of the fluid retaining layer 402, over the armour layer 404, is a buoyancy layer 406. The buoyancy layer is formed from a plurality of discrete elongate buoyancy elements $406_1$, $406_2$, $406_n$, etc. The buoyancy elements $406_{1-n}$, extend along the longitudinal length of the flexible pipe body, concentric (coaxial) to the central longitudinal axis C, and helically wound at a lay angle of about 25 degrees with respect to 25 the longitudinal axis of the flexible pipe body. As such, the buoyancy elements $406_{1-n}$, all lie parallel to each other to form a buoyancy layer that is concentric with the fluid retaining layer and armour layer. It may be useful to helically wind the buoyancy elements contrahelically to the underlying helically wound tensile armour wires. With this arrangement, torque in the pipe layers will be balanced through the pipe structural design.

In this embodiment, each of the plurality of buoyancy elements is a rod (elongate piece) of syntactic foam having an oval-shaped cross section. The syntactic foam has a density less than the density of sea water, and thus provides buoyancy or uplift to the flexible pipe body in use as part of a riser. The syntactic foam is also deformable, allowing the flexible pipe to have the necessary flexibility in bending.

The discrete buoyancy elements $406_{1-n}$, are not positively adhered to the underlying layer, but can be connected to an end fitting at either end of the pipe body. Alternatively, the buoyancy elements could be adhered to the underlying layer by welding or adhesive 5 bonding agent or clamping (addition of a circular clamping device around the full circumference of the pipe body), for example.

The actual dimensions and size of buoyancy layer is selected in accordance with the water environment such as depth of use, and the pipe parameters such as dimensions and mass, similarly to the current method of determining how many buoyancy aids are to be added to a flexible pipe, and can be determined by a person skilled in the art. For example, the buoyancy layer could be designed to produce about 100 kg/m of additional net buoyancy in use under the sea.

To form the flexible pipe body 400, the fluid retaining layer 402 may be extruded onto a mandrel in a known manner. Then the armour layer 404 is wrapped over the fluid retaining layer 402. Then, the buoyancy layer is formed by helically winding the plurality of discrete buoyancy elements over the armour layer. The buoyancy elements may optionally then be fastened in place with adhesive, weldments or clamps, etc.

Of course, the flexible pipe body 400 may include further layers, such as those illustrated in FIG. 2, in addition to those layers illustrated in FIGS. 4a and 4b.

Figure 5:
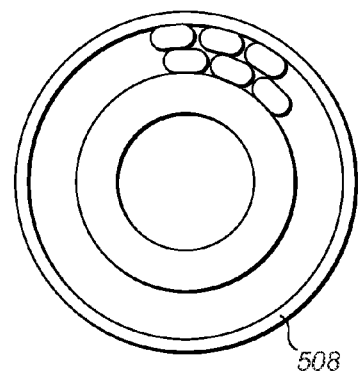
FIG. 5 illustrates a cross section of another flexible pipe body.

In particular, as shown in FIG. 5, the flexible pipe body may additionally include an outer protective sheath 508 provided over the buoyancy layer 406. An outer sheath will help to prevent the ingress of sea water into the internal layers of the flexible pipe body in use. An outer sheath will also act to help retain the buoyancy elements in position, in addition to or instead of bonding agent/weldments/clamping elements, etc. The outer sheath 508 is formed from polymer such as HDPE, though could alternatively be of TPE, PA-11, PA-12, for example.

Flexible pipe body as described in the embodiments above may then the formed into a section of flexible pipe by the addition of one or two end fittings, respectively at the first and second ends of the pipe body. Sections of flexible pipe may then be joined end to end to form a riser. In this respect, it is noted that a riser may aptly be formed of several sections of flexible pipe, and the sections of flexible pipe may be optimized to suit their respective position in the water in use. For example, with a riser that has a top section (connected to a floating facility), a middle section and a lower section (reaching the seabed), the top section is the section that generally encounters the greatest tension, and should be optimized to reduce the tension at the top section, and the lower section experiences the greatest pressures from the surrounding deep water, and should be optimized to include the thickest armour layers such as carcass and pressure armour layers. Therefore, the middle section may be optimized to assist in reducing tension in the top section whilst reducing the weight of pipe that acts as a tensile load on the lower section. The sections of flexible pipe may therefore have different layers and/or amounts of buoyancy provided.

Various modifications to the detailed designs as described above are possible. For example, the discrete buoyancy elements may be provided at other angles with respect to the longitudinal axis of the flexible pipe body. The buoyancy elements may be provided at a zero degree helical pitch, i.e. provided longitudinally along the pipe body, or helically wrapped at any angle up to about 85 degrees from the longitudinal axis of the pipe body. Aptly, the buoyancy elements are provided at around 20 to 30 degrees from the longitudinal axis, though other angles may also be used.

Although the above described embodiments show cylinders with oval cross section as the discrete buoyancy elements, the buoyancy elements may have other cross sections and forms, such as a circular cross section or rectangular cross section for example. The buoyancy elements need not have identical forms, there may be shaping so as to allow the elongate elements to fit together in some manner (e.g. with protrusions and cavities in a jigsaw like manner). Of course it may be useful to maintain the amount of buoyancy about equal around the circumference of a pipe body so as to not disturb how a section of riser sits in the water. The buoyancy layer may therefore include one or more circular row of buoyancy elements provided concentrically.

In another embodiment, the buoyancy elements as described above may be formed from tubes filled with a material having a density less than the density of sea water, such as air or syntactic foam. The lubes may be of stainless steel or other metal or alloy, for example. The tube parameters such as thickness and material should be selected to have sufficient strength to resist collapse, whilst also providing the required buoyancy.

Figure 4C:
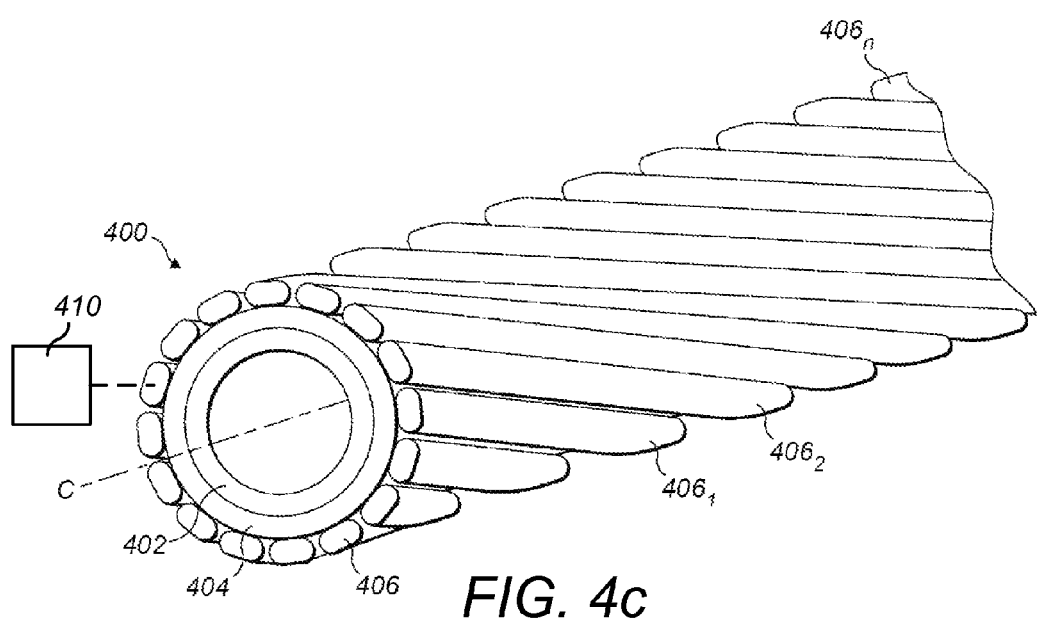
FIG. 4c illustrates a perspective view of another embodiment of a flexible pipe body including an external fluid source.

In a yet further related embodiment, as shown in FIG. 4c, the plurality of buoyancy elements may be connected to an external fluid source 410, such as an air flow system with pump/suction means located on a vessel carrying the riser. As such the volume of fluid within one or more buoyancy element can be actively increased and/or decreased enabling the buoyancy level to be changed.

With the above-described flexible pipe body, the buoyancy material needed to relieve tension on a riser can be manufactured and combined with the flexible pipe at the initial manufacturing stage. As such, the formed flexible pipe may be packaged, transported and installed as a single unit, rather than separate pipe and buoyancy aids that are affixed to the flexible pipe at the time of pay out into the sea. This gives improvements that simplify handling and ensure the pipe is cost effective.

In addition, providing a larger number of discrete buoyancy elements around a pipe body allows for redundancy i: one of the buoyancy elements is damaged, for example.

Furthermore, by providing a continuous length of buoyancy along a riser or a section of riser, the problem known as birdcaging is less likely to occur. This is because, when a riser is forced to move in an up and down manner, a full length of (buoyant) riser will be less likely to allow compressive forces on the pipe at the touch down area of a riser. On the other hand with a single buoyancy aid at a particular point along a riser length (as per known arrangements), the localized buoyancy may stiffen the riser locally, transferring additional tension and compression forces into the section of pipe located below that buoyancy aid. The compressive forces can cause the helically wrapped wires to try to lift out of the plane of the layer in the structure (radial buckling) or twist in the plane or the layer (lateral buckling).

With the above-described flexible pipe body, the provision of buoyancy elements having a relatively shallow angle of helical winding, such as 20 to 30 degrees from the longitudinal axis will require a shorter length of each buoyancy element in total. As such there should be less of a requirement for joints in the buoyancy elements, which are disadvantageous because joints may be the source of a leak path.

With the above-described flexible pipe body including discrete buoyancy elements formed as tubes, the tubular outer portion may advantageously act as a shield to help prevent degradation and aging of the inner buoyancy material.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intend cd to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the stops of any method or process so disclosed.

The reader's attention is directed to all papers and documents which are filed concurrently with or previous to this specification in connection with this application and which are open to public inspection with this specification, and the contents of all such papers and documents are incorporated herein by reference.

Various embodiments of the invention have been described. These and other embodiments are within the scope of the following claims.

Th invention claimed is:

1. A flexible pipe body, comprising:
an inner fluid retaining layer;
an armour layer provided radially outwards of the inner fluid retaining layer; and
a buoyancy layer comprising a plurality of discrete elongate buoyancy elements provided radially outwards of the fluid retaining layer wound at a helical pitch angle equal to or more than 0 degrees and less than about 85 degrees to the longitudinal axis of the flexible pipe body, and a protective outer sheath layer provided radially outwards of the plurality of discrete buoyancy elements.

2. The flexible pipe body as claimed in claim 1, wherein each of the plurality of buoyancy elements extends along a longitudinal axis of the flexible pipe body.

3. The flexible pipe body as claimed in claim 1, wherein each of the plurality of buoyancy elements extends in parallel to the remainder of the plurality of buoyancy elements.

4. The flexible pipe body as claimed in claim 1, wherein the plurality of discrete buoyancy elements comprise tubes filled with a material with a density less than the density of sea water.

5. The flexible pipe body as claimed in claim 4, wherein the tubes are filled with air or syntactic foam.

6. The flexible pipe body as claimed in claim 1, wherein the plurality of discrete buoyancy elements comprise rods of a material with a density less than the density of sea water.

7. The flexible pipe body as claimed in claim 6, wherein the rods comprise syntactic foam.

8. The flexible pipe body as claimed in claim 1, wherein at least one of the plurality of discrete buoyancy elements are configured to be connectable to an external fluid source.

9. The flexible pipe body as claimed in claim 1, wherein the plurality of discrete buoyancy elements are helically wound at a lay angle of around 20 to 30 degrees with respect to the longitudinal axis of the flexible pipe body.

10. The flexible pipe body as claimed in claim 9, wherein the plurality of discrete buoyancy elements are helically wound, contra-helically to wound wires of an underlying layer.

11. The flexible pipe body as claimed in claim 9, wherein the armour layer is a tensile armour layer.

12. A flexible pipe comprising the flexible pipe body as claimed in claim 9 and at least one end fitting.

13. A riser comprising at least one flexible pipe as claimed in claim 12.

14. A method of manufacturing a flexible pipe body, comprising:
providing an inner fluid retaining layer;
providing an armour layer radially outwards of the inner fluid retaining layer; and
providing a buoyancy layer comprising a plurality of discrete elongate buoyancy elements radially outwards of the fluid retaining layer wound at a helical pitch angle equal to or more than 0 degrees and less than about 85 degrees to the longitudinal axis of the flexible ripe body, and providing a protective outer sheath layer radially outwards of the plurality of discrete buoyancy elements.

* * * * *